(12) United States Patent
Kurzeja et al.

(10) Patent No.: US 6,490,540 B1
(45) Date of Patent: Dec. 3, 2002

(54) METHOD AND APPARATUS FOR MEASURING DRIVELINE ANGLES

(75) Inventors: Patrick Kurzeja, White Lake, MI (US); Ronald N. Brissette, Lake Orion, MI (US); Jim Hawkins, Madison, AL (US); Christopher S. Keeney, Troy, MI (US); Christos Kyrtsos, Southfield, MI (US); Jack Darrin Oates, Fletcher, NC (US); Tom Sanko, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 87 days.

(21) Appl. No.: 09/713,093

(22) Filed: Nov. 15, 2000

(51) Int. Cl.[7] ............................................. G01C 17/00
(52) U.S. Cl. ......................................... 702/151; 73/457
(58) Field of Search ........................... 280/5.5; 73/457; 180/403; 101/116; 702/151

(56) References Cited

U.S. PATENT DOCUMENTS

| | | | | | |
|---|---|---|---|---|---|
| 5,431,049 | A | * | 7/1995 | Kopp | 73/458 |
| 5,996,722 | A | * | 12/1999 | Price | 180/403 |
| 6,131,454 | A | * | 10/2000 | Kopp et al. | 73/457 |
| 6,345,826 | B1 | * | 2/2002 | Kurzeja et al. | 280/5.5 |
| 2002/0002915 | A1 | * | 1/2002 | Takasawa et al. | 101/116 |

\* cited by examiner

*Primary Examiner*—John S. Hilten
*Assistant Examiner*—Xiuqin Sun
(74) *Attorney, Agent, or Firm*—Carlson, Gaskey & Olds

(57) ABSTRACT

A system measures multiple operational angles of a driveline assembly and compares the signals to each other to determine whether the angles and the respective driveline components are properly balanced. Different types of sensor assemblies can be used to measure the operational angles including various types of contact and non-contact sensors. In one example, the operational angle between one axle differential case and a corresponding universal joint can be compared to the operational angle between another axle differential case and corresponding universal joint mounted at an opposite end of the driveline. If the angles are equal or very close to one another than the angles are properly balanced. If the ratio between the two angles exceeds a predetermined limit, the driveline components are not properly balanced and the components can be repositioned to avoid premature wear.

24 Claims, 5 Drawing Sheets

METHOD AND APPARATUS FOR MEASURING DRIVELINE ANGLES

BACKGROUND OF THE INVENTION

This invention relates to a method and apparatus for measuring operational angles of driveline components to determine whether the driveline is properly balanced.

Most vehicle drivelines include drive axles that are connected to a driveshaft or other driveline component with a universal joint. Universal joints, or U-joints, are utilized on most vehicle drivelines. One common type of U-joint is known as a Cardon universal joint. In this type U-joint, two yokes each have two bore locations at diametrically opposed positions. The yokes are each mounted to two posts on a cross member. The combination allows the two yokes to move angularly relative to each other with respect to the center of the cross member.

The U-joint is typically utilized as a portion of a driveline for a vehicle, and allows two shaft components to be at different angles relative to each other to accommodate relative movement and angular misalignment. U-joint connections are used to interconnect drive axles that are not mounted to the vehicle in a common plane.

For example, a typical driveline with two drive axles includes the following connections. One drive axle has a center differential for driving a set of vehicle wheels. The center differential has an input and an output for driving connection to an input for a second drive axle. A driveshaft is used to connect the first axle to the second axle. One end of the driveshaft is connected to the output of the first axle with a U-joint assembly and the other end of the driveshaft is connected to the input of the second drive axle with another U-joint assembly. A driveline operational angle is defined as the angle between differential centerline and the driveshaft centerline. Preferably, the operational angle at one end of the driveshaft is equal or close to the operational angle at the opposite end of the driveshaft. If the angles are equal or close to each other, the driveline components are properly balanced. If the operational angles are not close to each other there is a mismatch. If the mismatch exceeds a predetermined limit, than the driveline components are not properly balanced, which can result in premature wear of the components. Unbalanced driveline components can also cause undesirable vibrations and noise.

For various diagnostic and control purposes, it would be valuable to be able to measure multiple driveline operational angles and compare them to each other to determine whether the driveline components are properly balanced. However, no simple method has been developed for measuring operational angles during the operation of a vehicle.

For the above reasons, it would be desirable to develop a method and apparatus for monitoring and measuring driveline operational angles during real time operation of the vehicle. The method and apparatus should be inexpensive and easily incorporated into existing driveline systems.

SUMMARY OF THE INVENTION

In a disclosed embodiment of this invention, a system measures multiple operational angles of a driveline assembly and compares the signals to each other to determine whether the angles and the respective driveline components are properly balanced. Different types of sensor assemblies can be used to measure the operational angles.

In a preferred embodiment of this invention, a driveline assembly includes a first drive axle with a first center differential having a first input and a first output. A second drive axle has a second center differential with a second input. A driveline component interconnects the first and second axles at opposing ends and defines a central axis. A first universal joint assembly connects a first end of the driveline component to the first output and defines a first operational angle between the first center differential and the central axis. A second universal joint assembly connects a second end of the driveline component to the second input and defines a second operational angle between the second center differential and the central axis. A sensor assembly is mounted adjacent to the driveline component to measure the first and second operational angles. The sensor assembly generates a first signal corresponding in magnitude to the first operational angle and a second signal corresponding in magnitude to the second operational angle.

Preferably, a processor is operationally linked to an indicator. The processor compares the first and second signals to each other to determine a mismatch ratio. The processor generates an activation signal to activate the indicator when the mismatch ratio exceeds a predetermined limit.

In another embodiment, the processor is operationally linked to an adjustment mechanism. The processor compares the first and second signals to each other to determine a mismatch ratio. The processor generates an activation signal to activate the adjustment mechanism, which adjusts a vehicle parameter to correct the first and/or second operational angles when the mismatch ratio exceeds a predetermined limit.

Various types of sensors can be used to measure the driveline operational angles. In one embodiment, accelerometers are mounted to each of the axles and acceleration due to gravity measurements are used to determine the operational angles. In another embodiment, fluid level sensors are used to determine the operational angles. Other sensors used to determine the operational angles include potentiometers, photo cell sensors, proximity sensors, non-contact magnetic sensors, and photo/digital imaging cameras, for example.

The method for determining operational angles of driveline components includes the following steps. A first axle assembly and a second axle assembly are interconnected by a driveline component having universal joint assemblies mounted at opposing ends. A first operational angle is measured between the first axle assembly and one of the universal joint assemblies and a second operational angle is measured between the second axle assembly and the other of the universal joint assemblies. The second operational angle is compared to the first operational angle to determine a mismatch ratio and an indicator signal is generated if the mismatch ratio exceeds a predetermined limit.

The subject invention provides a simple and easy method and apparatus for determining whether driveline components are properly balanced. The invention is easily incorporated into existing driveline systems and is easy to maintain. These and other features of the present invention can be best understood from the following specifications and drawings, the following of which is a brief description.

DETAILED DESCRIPTION OF A PREFERRED EMBODIMENT

Figure 1:
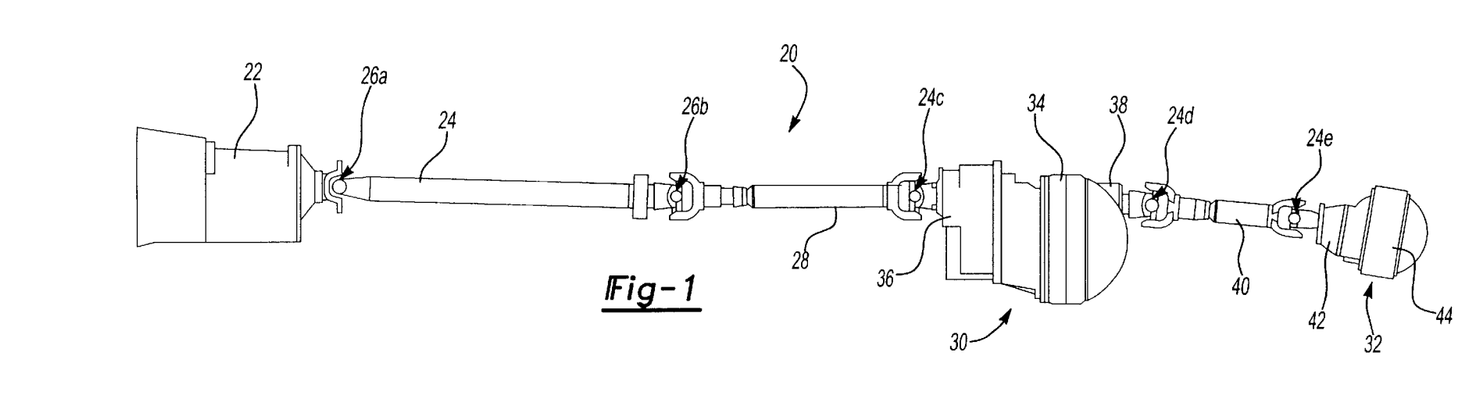
FIG. 1 is a schematic view of a driveline assembly incorporating multiple universal joint assemblies.

A vehicle driveline assembly 20 is shown schematically in FIG. 1. The driveline assembly includes a transmission 22 that is driven by an engine (not shown) and which is coupled to a first driveshaft 24 with a first universal joint (u-joint) assembly 26a. The first driveshaft 24 is connected to a second driveshaft 28 with a second u-joint assembly 26b. The driveline 20 preferably includes a first drive axle, shown generally at 30 and a second drive axle, shown generally at 32. The first drive axle 30 has a first central differential 34 having an input 36 and an output 38. The input 36 is coupled to the second driveshaft 28 with a third u-joint assembly 24c.

A third driveshaft 40 is used to interconnect the first 30 and second 32 drive axles. A fourth u-joint assembly 24d couples one end of the third driveshaft 40 to the output 38 and a fifth u-joint assembly 24e couples the opposite end of the third driveshaft 40 to an input 42 of a second central differential 44 for the second drive axle 32.

Figure 2:
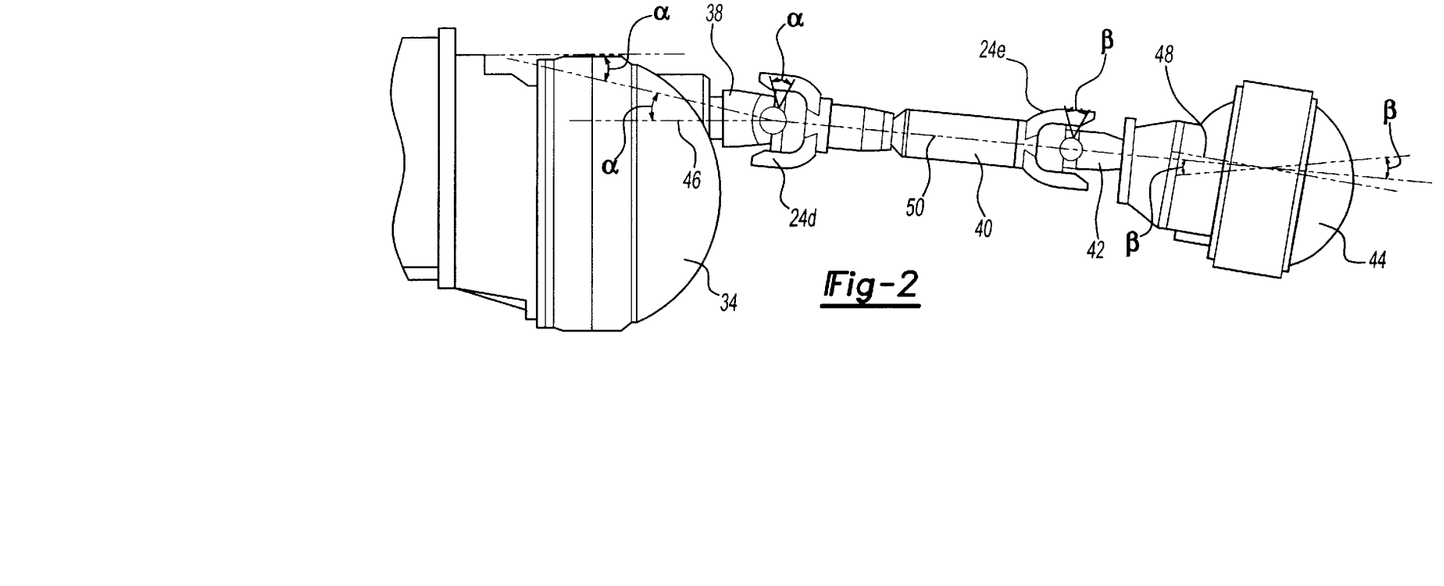
FIG. 2 is a schematic view of a driveline connection between two drive axles.

The present invention discloses an apparatus and method for measuring and comparing operational angles for these various driveline components to determine whether the driveline 20 is properly balanced. As shown in FIG. 2, the first central differential 34 defines a first axis 46 at the output 38, and the second central differential 44 defines a second axis 48 at the input 42. The third driveshaft 40 defines a central axis 50 that is typically transverse to the first 46 and second 48 axes. An example of a driveline operational angle is defined as the angle between the respective differential and the central axis 50 of the driveshaft 40. Thus, in the embodiment shown in FIG. 2, a first operational angle a is defined between the first central differential 34 and the u-joint assembly 24d and a second angle β is defined between the second central differential 44 and the u-joint assembly 24e. Typically, these operational angles are small, within the range of 0° to 7°. Angles greater than 7° tend to generate undesirable vibrations and cause premature wear of driveline components.

As discussed above, it is important that the operational angles along a driveline 20 be equal to or close to each other such that proper driveline balance is maintained. Thus, the first α and second β operational angles should be within a certain predetermined tolerance range of each other. Usually +/−1° is an acceptable difference between operational driveline angles, however, other predetermined limits, ranges, or mismatch ratios could be used. For example, a first operational angle α of 4.5° and a second operational angle β of 5.0° could be acceptable but a first operational angle a of 4.5° and a second operational angle β of 6.5° may not be acceptable.

Various sensor assemblies can be used to measure these operational angles. In one embodiment, shown in FIG. 3, a photo/digital imaging assembly 52 is used to determine the operational angles α and β. The imaging assembly 52 includes a camera 54 that is mounted to a vehicle frame member 56. The camera 54 defines a vertical axis 58 that is preferably orientated at a perpendicular angle relative to the central axis 50. The camera 54 includes a scanning mechanism 60 that scans the first differential 34, the second differential 44, the driveshaft 40, and the u-joint assemblies 24d, 24e to generate an image. A digitizing component 62 digitizes the scanned image and generates digital data used to determine the operational angles α and β. The operational angles α and β are compared to one another to determine a mismatch ratio. If the mismatch ratio exceeds a predetermined limit, either an indicator device is activated to alert a vehicle operator and/or an adjustment mechanism is activated to adjust some vehicle parameter to bring the operational angles α and β into an acceptable range. This will be discussed in greater detail below.

Figure 4:
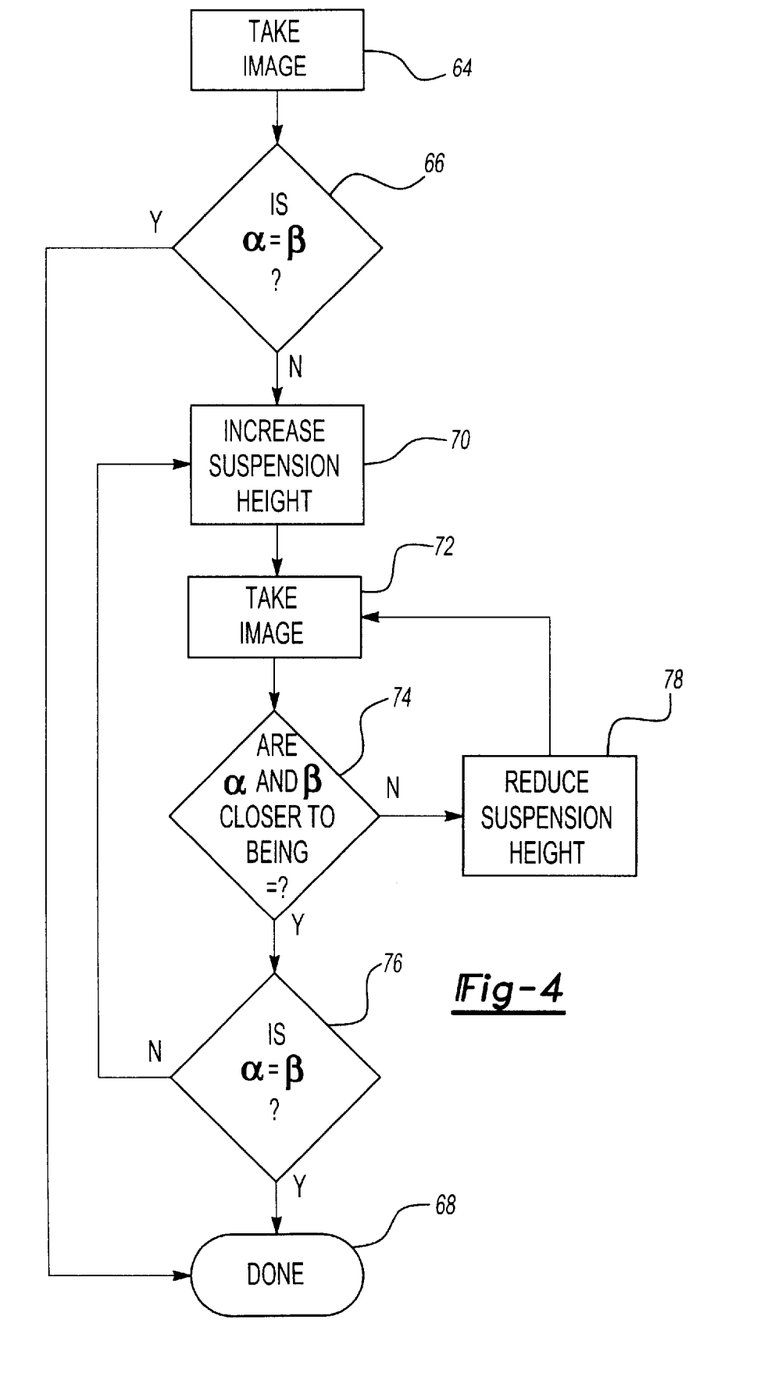
FIG. 4 is a graphical representation of the process used to measure and correct driveline operational angles.

This process is shown in greater detail in the flowchart of FIG. 4. First, the camera generates the image and determines the operational angles α and β at step 64. Next, a comparison is made to determine if the first operational angle α is equal or within an acceptable range with the second operational angle β at step 66. If the angles α and β are equal or close enough then the process is done and no adjustment is needed, step 68. If the angles α and β are not equal and the mismatch ratio has exceeded the predetermined limit than an adjustment may be necessary. One vehicle component that can be used to change the operational angles is the air suspension system (not shown). If the predetermined limit is exceeded, the air suspension system can be increased in height, step 70.

After adjustment, another image is generated at step 72 and the angles α and β are determined. A comparison is made to determine whether the angles α and β are closer together at step 74. If the angles α and β are closer together the next determination is whether the angles α and β are equal to each other or are within an acceptable range of one another at step 76. If the angles α and β are acceptable than no further adjustment is needed. If at step 74 the angles α and β are not closer together, i.e. are further apart from one another, than the suspension height can be reduced, step 78. Another image is taken 72 and the process is repeated until step 76 is satisfied. It should be understood that this adjustment process could be used with any of the sensor assemblies of the subject invention.

Figures 3, 5, 6, 7:
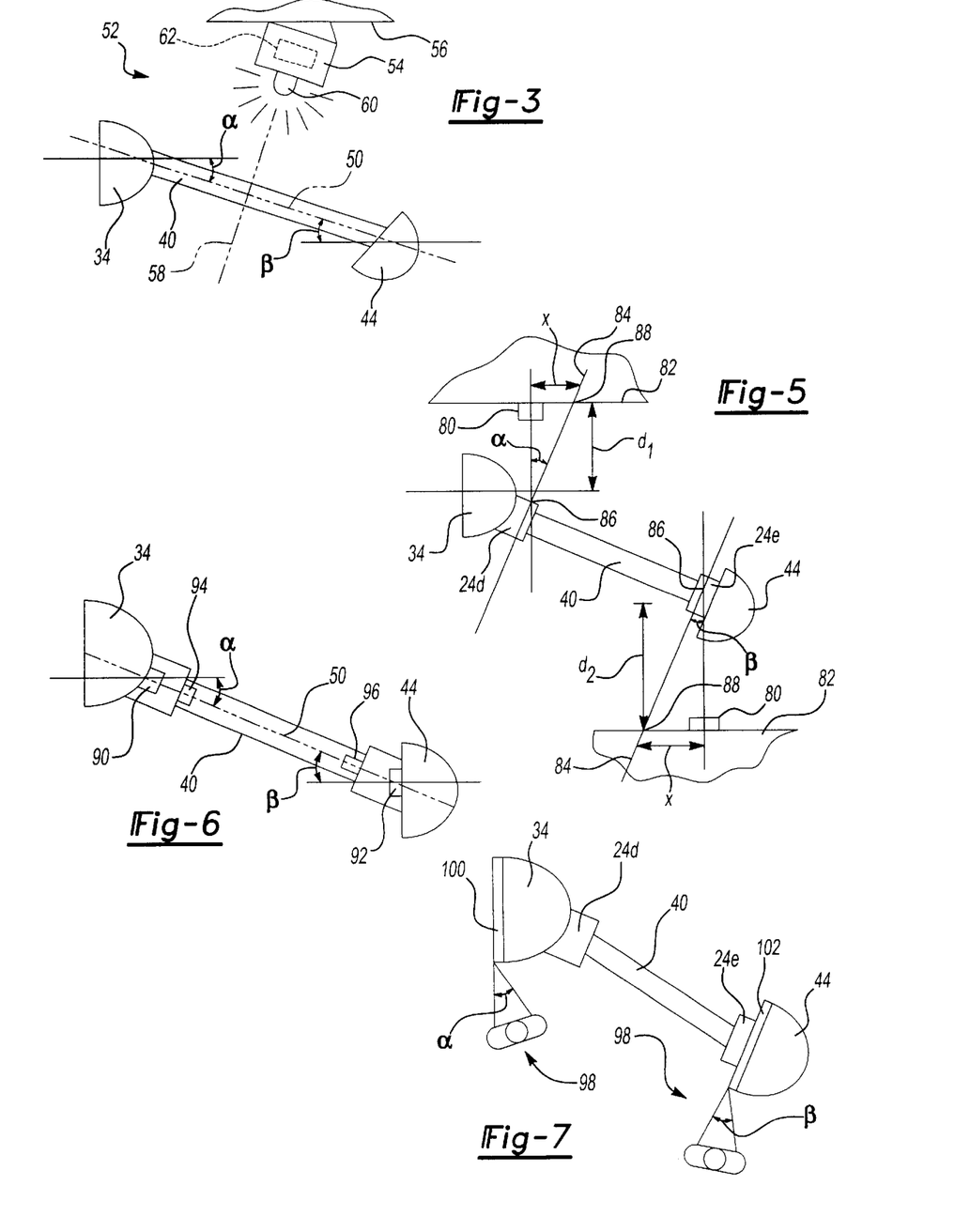
FIG. 3 is a schematic view of one embodiment of a sensor assembly for measuring driveline operational angles.
FIG. 5 is a schematic view of an alternate embodiment of a sensor assembly for measuring driveline operational angles.
FIG. 6 is a schematic view of an alternate embodiment of a sensor assembly for measuring driveline operational angles.
FIG. 7 is a schematic view of an alternate embodiment of a sensor assembly for measuring driveline operational angles.

In an alternate embodiment, shown in FIG. 5, proximity sensors 80 are used to determine the operational angles α and β. The proximity sensors 80 are mounted to a vehicle structure 82, such as a frame member, for example. Proximity sensors 80 produce a voltage that is directly proportional to the distance between the sensor 80 and a metal object, such as the u-joint assemblies 24d, 24e. The proximity sensor can be any type of proximity sensor known in the art including an optical, laser, ultrasonic, or any other ranging technique sensor.

The proximity sensor 80 mounted adjacent to the first central differential 34 will generate a voltage that is proportional to the distance dl that the sensor 80 is away from the u-joint 24d. The proximity sensor 80 mounted adjacent to the second central differential 44 will generate a voltage that is proportional to the distance d2 that the sensor 80 is away from u-joint 24e. In one embodiment, the sensors 80 can be mounted such that if d1=d2 then the operational angles α and β are matched and if d1 is not equal to d2 then the operational angles α and β are mismatched and a control feedback signal can be generated to initiate a warning or activate an adjustment mechanism.

In another embodiment, the proximity sensors 80 can be mounted at various positions along the driveshaft 40. The operational angles α and β can be determined by locating a predetermined distance x away from the where line of intercept 84 hits the respective u-joint 24d, 24e. For example, as shown in FIG. 5, the proximity sensor 80 intercepts the u-joint 24d at a point 86. A second point 88 is defined at the predetermined distance x along the vehicle frame member 82. The intercept line 84 is drawn between points 86 and 88, forming a right triangle. The first operational angle α corresponds to the angle between the line from the proximity sensor 80 to the u-joint and the intercept line 84. The distance d1 is known and the distance x is known, thus, the operational angle α is equal to the arctan of x divided by d1 ($\alpha=\tan^{-1}(x/d1)$). The second operational angle β is derived the same way as the first operational angle α, and the same predetermined distance x is used. The second operational angle β is equal to the arctan of x divided by d2 ($\beta=\tan^{-1}(x/d2)$).

In an alternate embodiment, shown in FIG. 6, photo cell sensors are used to determine the operational angles α and β. A first photo sensor 90 is mounted to the first center differential 34 and a second photo sensor 92 is mounted to the second center differential 44. A first photo detector 94 is mounted on u-joint 24d parallel to the central axis 50 and a second photo detector 96 is mounted on u-joint 24e parallel to the central axis 50. If the first photo sensor 90 and detector 94 are aligned with the second photo sensor 92 and detector 96 then the operational angles α and β are equal. If the first photo sensor 90 and detector 94 are not aligned with the second photo sensor 92 and detector 96 than the operational angles α and β are mismatched. Essentially, alignment is determined when maximizing intensity is received. The greater the misalignment, the greater the mismatch. If the mismatch exceeds a certain predetermined limit a control feedback signal can be generated to activate an indicator and/or adjustment mechanism.

In an alternate embodiment, shown in FIG. 7, potentiometers 98 are used to determine the operational angles α and β. The operation of potentiometers and other contact type sensors is well known in the art and will not be discussed in detail. A first mounting plate 100 is fixed to the first center differential 34 and a second mounting plate 102 is fixed to the second center differential 44. The potentiometers 98 are mounted to the mounting plates 100, 102.

Figure 8:
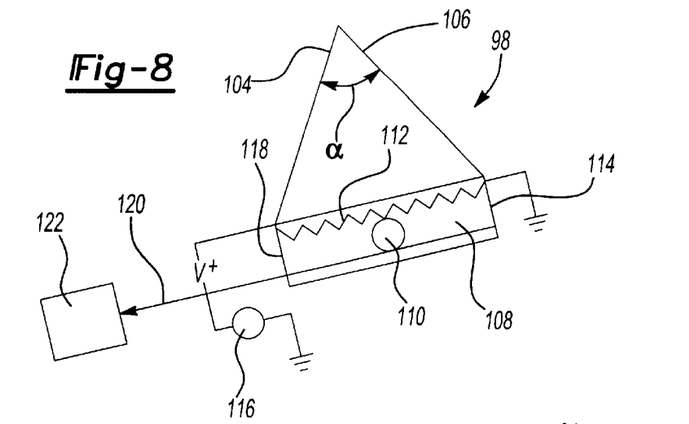
FIG. 8 is a magnified view of the sensor assembly of FIG. 7.

The potentiometers 98 of this embodiment are shown in greater detail in FIG. 8. The angles α and β are between the first link 104 and the ball, which stops where gravity takes it perpendicular to the ground. A first link 104 is fixed parallel to the mounting plates 100, 102. A second link 106 is also mounted to the mounting plates 100, 102 and a cylindrical tube 108 is used to interconnect the first 104 and second 106 links. A spherical member such as a ball 110 is received within the tube and wipes against potentiometer wiping elements 112 as the respective axle tilts. As the ball 110 moves within the tube 108 an output voltage V+ is generated that is proportional to the respective operational angle α or β. The potentiometers 98 are grounded at one end 114 of the tube 108 and are connected to a battery power source 116 at an opposite end 118 of the tube 108. The output voltage at each potentiometer is converted to a signal 120 corresponding in magnitude to the respective operational angle α or β. This signal is sent to a central processor unit (CPU) 122 or other similar device where angles α and β can be compared to each other to determine a mismatch ratio. The CPU 122 can than generate a control signal to activate an indicator or adjustment mechanism.

Figures 9, 10A, 10B:
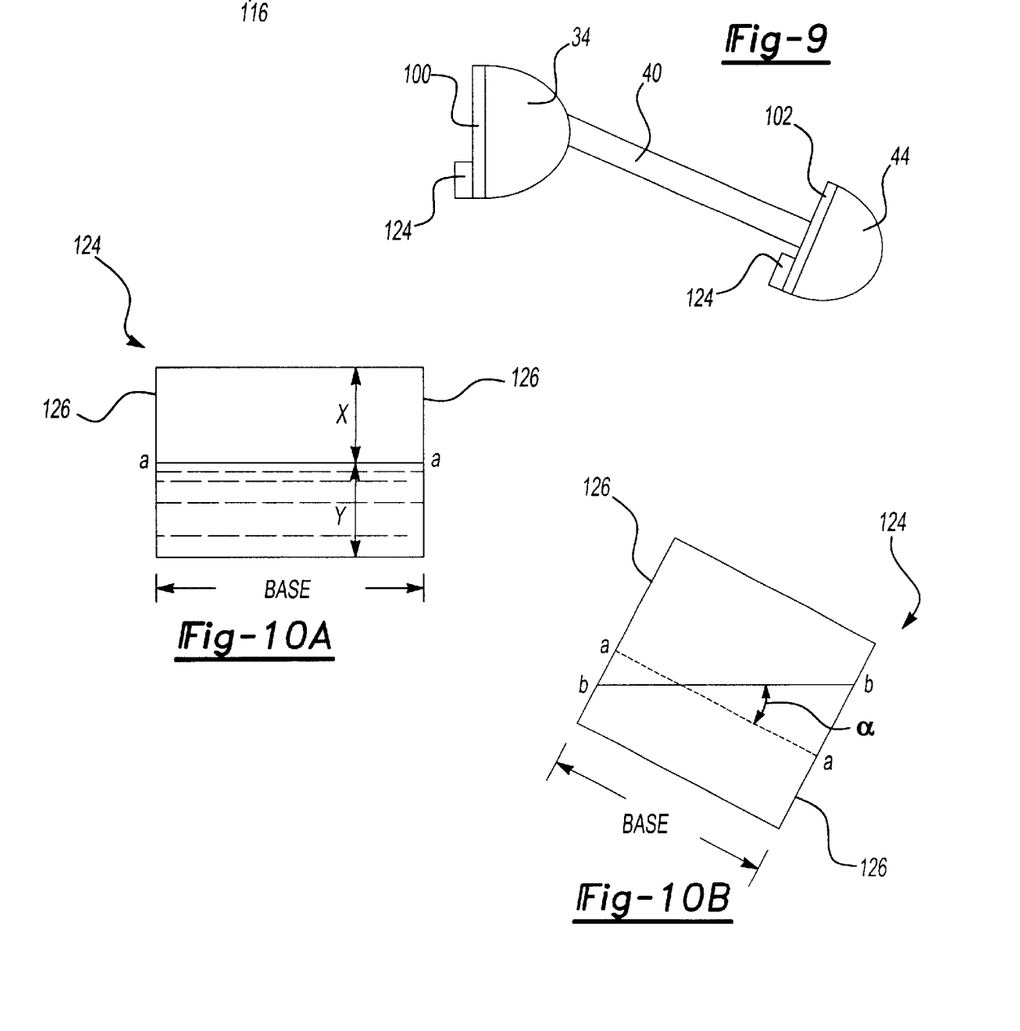
FIG. 9 is a schematic view of an alternate embodiment of a sensor assembly for measuring driveline operational angles.
FIG. 10a is a magnified view of the sensor assembly of FIG. 9.
FIG. 10b is a magnified view of the sensor assembly of FIG. 9.

In an alternate embodiment, shown in FIG. 9, sealed fluid level sensors 124 are used. One fluid level sensor 124 is fixed to the first mounting plate 100 and a second fluid level sensor 124 is fixed to the second mounting plate 102. These fluid level sensors 124 operate in a manner similar to that of fluid sensors used to measure the level of fluid in a gas tank when the vehicle is parked on an incline.

A level fluid sensor 124 is shown in FIG. 10a, i.e., the fluid level is parallel to the ground. In this embodiment a sidewall 126 of the sensor 124 would be mounted to the respective mounting plate, which would be perpendicular to the ground. A level fluid sensor 124 would indicate a measurement of either x, the distance above the fluid level to the top of the sensor 124 or y, the distance from the bottom of the sensor 124 to the fluid surface. The fluid sensor 124 has a base distance and an intercept point "a" where the fluid intercepts the sidewalls 126. The intercept point "a" is located at the same distance from the base on each sidewall 126 when the fluid surface is level.

A tilted fluid sensor 124 is shown in FIG. 10b. The sensor 124 has a base distance and an intercept point "b" where the fluid intercepts the sidewalls 126. The "level" intercept point "a" for a fluid sensor 124 in a level condition is shown in dashed lines. The operational angle a is equivalent to the angle between intercept line a—a and intercept line b—b. Note that if the distance y were measured as in the embodiment shown in FIG. 10a, a greater value for y would be measured at one sidewall 126 than at the other sidewall 126, thus generating a false reading. The error generated by this false reading is directly proportional to the operational angle α. The values for "a," "b," and the base distance are known. The operational angle α is equal to the arctan of the quantity (b−a) multiplied by two and divided by the base distance ($\alpha=\tan^{-1}(2(b-a)/base)$).

Figure 11:
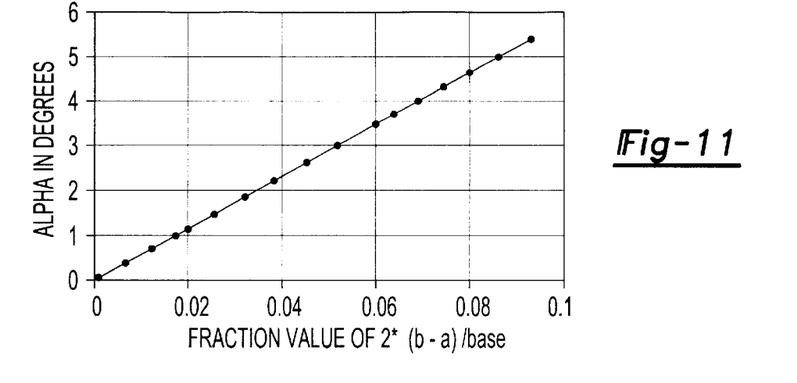
FIG. 11 is a graphical representation of the linear relationship used to determine the operational angles for the sensor assembly of FIG. 9.

A graph, shown in FIG. 11, shows that there is a linear relationship for small angles, i.e., angles less than 5°, based on this calculation. The graph shows α in degrees on the y-axis vs. the fraction value of (2*(b−a)/base) on the x-axis. For example, a fraction value of 0.02 would indicate an operational angle α of approximately 1.2°.

Figures 12, 13A, 13B, 14:
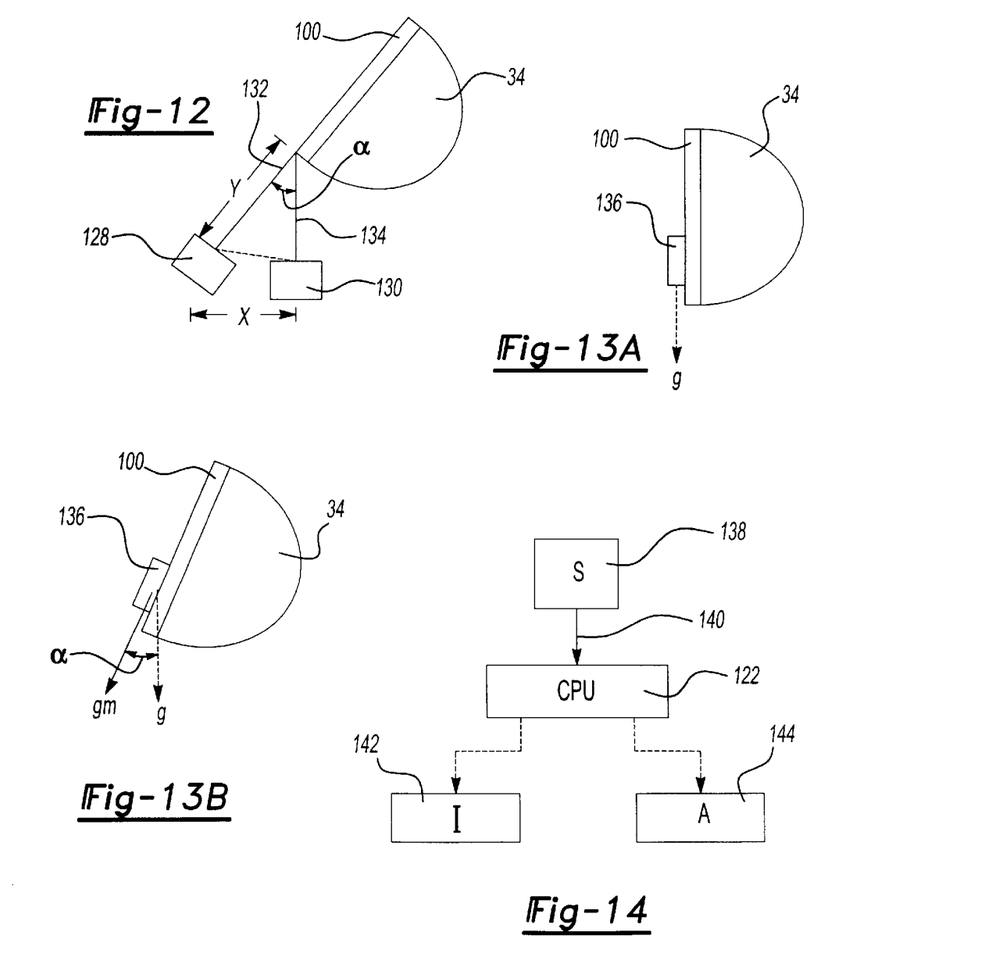
FIG. 12 is a schematic view of an alternate embodiment of a sensor assembly for measuring driveline operational angles.
FIG. 13a is a schematic view of an alternate embodiment of a sensor assembly for measuring driveline operational angles.
FIG. 13b is a schematic view of the sensor assembly of FIG. 13a at a different operational position.
FIG. 14 is a graphical representation of the process for indicating and/or adjusting mismatched operational angles.

An alternate embodiment, shown in FIG. 12 utilizes a magnetic noncontact sensor assembly to measure the operational angles α and β. These types of sensors are well known in the art and will not be discussed in detail. In this embodiment, a proximity pickup coil sensor 128 is mounted parallel with the mounting plate 100. A magnetic member 130 is suspended from the mounting plate 100 like a pendulum. When the center differential 34 is tilted, the proximity coil sensor 128 is positioned at an angle and the magnetic member 130 hangs straight down due to the force of gravity. The output of the sensor 128 is directly proportional to the distance of separation x between the sensor 128 and the magnetic member 130. The proximity coil sensor 128 is fixed at a predetermined distance y from the mounting plate 100 and the operational angle α is the angle between the coil sensor connection 132 and the magnet connection 134. The operational angle α is equal to the arctan of x divided by y ($\alpha = \tan^{-1}(x/y)$), which behaves as a linear function for small angles. A similar sensor assembly is mounted to the second center differential 44 to measure the second operational angle β. The angles α and β are then compared to each other to determine whether or not there is any mismatch.

An alternate sensor embodiment is shown in FIGS. 13a and 13b. In this embodiment, an accelerometer 136 is mounted parallel to the mounting plate 100, 102 of each center differential. When the differential 34 is perpendicular to ground level, the accelerometer 136 measures the true value of the acceleration due to gravity "g" indicated by the vertical line, shown in FIG. 13a. When the differential 34 is mounted at an angle, a perceived acceleration due to gravity "gm" is measured, shown in FIG. 13b. The operational angle α is the angle formed between the vectors indicating the perceived gm and true g accelerations due to gravity. The operational angle α is derived from the following formula: $\alpha = \cos^{-1}(gm/g)$.

As discussed above, each of the sensor embodiments, shown generally at 138 in FIG. 14, generates signals 140 that correspond in magnitude to the operational angles α and β. These signals 140 are sent to the CPU 122 where they are compared to each other to determine the mismatch ratio. If the mismatch ratio exceeds a predetermined limit then an indicator mechanism 142 (audible or visual) can be activated to alert a vehicle operator that the driveline 20 is not properly balanced and/or an adjustment mechanism 144, such as the air suspension, for example, can be activated to bring the angles α and β into alignment.

The method for determining operational angles α and β for driveline components includes the following steps. A first axle assembly 30 and a second axle assembly 32 are interconnected by a driveline component such as a driveshaft 40 having universal joint assemblies 24d, 24e mounted at opposing ends. A first operational angle α is measured between the first axle assembly 30 and one of the universal joint assemblies 24d and a second operational angle β is measured between the second axle assembly 32 and the other of the universal joint assemblies 24e. The second operational angle β is compared to the first operational angle α to determine a mismatch ratio and an indicator signal is generated if the mismatch ratio exceeds a predetermined limit. The indicator signal can be transmitted to a warning or indicator device 142 to alert a vehicle operator that the mismatch ratio has been exceeded or a control signal can be transmitted to an adjustment mechanism 144 for actively adjusting an adjustment component until the mismatch ratio is less than the predetermined limit.

As discussed above, the operational angles α and β can be measured by utilizing several different methods. In one embodiment, the angles α and β can be measured by mounting an accelerometer 136 to center differentials 34, 44, measuring the acceleration due to gravity at each of the accelerometers 136, and determining the first and second operational angles α and β based on gravity measurements. In another embodiment, the angles α and β can be measured by mounting at least one proximity pickup coil 128 to each of the mounting plates 100, 102 in a plane parallel to the mounting plates 100, 102, suspending a magnetic member 130 from each of the plates. The distance of separation is measured between the coil 128 and the magnetic member 130 and the first and second operational angles α and β are determined based on the separation measurements.

In another embodiment, the angles α and β can be measured by mounting a fluid sensor 124 to each center differential 34, 44, measuring the fluid level of each sensor 124, and determining the first and second operational angles the angles α and β based on the first and second fluid levels. The first and second fluid levels are compared to a base fluid level that is parallel to the ground to determine the first and second operational angles α and β.

In another embodiment, the angles α and β can be measured by mounting a potentiometers 98 to each differential 34, 44, and generating signals corresponding in magnitude to the operational angles α and β by generating an output voltage that is proportional to the angles α and β. The output voltage is generated by the interaction between a spherical member 110 and potentiometer wiping elements 112. It could also be a rotary potentiometer as an example.

In another embodiment, the angles α and β can be measured by mounting photo sensors 90, 92 on the differentials 34, 44 and mounting detectors 94, 96 on the universal joint assemblies 24d, 24e. Photo signals are generated by the sensors 90, 92 and detectors 94, 96 that are proportional to the angles α and β.

In another embodiment, the angles α and β can be measured by mounting proximity sensors 80 adjacent to each of the u-joint assemblies 24d, 24e and measuring the separation distance between the proximity sensor 80 and the respective u-joint assembly 24d, or 24e. The angles α and β are determined based on the separation measurements.

Another sensor option includes mounting a camera 54 on a vehicle structural member adjacent to the driveline component. The camera 54 scans the driveline 20 to generate an image, digitizes the image to generate digital data, and determines the first and second operational angles α and β based on the digital data.

In sum, the present invention discloses a simple way to measure multiple operational angles of a driveline during operation of a vehicle. The angles are compared to each other to determine whether or not the driveline is properly balanced. If the driveline is not properly balance, the vehicle operator can either be alerted to the imbalance, or vehicle components can be actively adjusted to correct the imbalance. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of determining operational angles of driveline components comprising the steps of:
   (a) providing a first axle assembly and a second axle assembly interconnected by a driveline component having universal joint assemblies mounted at opposing ends;
   (b) measuring a first operational angle between the first axle assembly and one of the universal joint assemblies;

(c) measuring a second operational angle between the second axle assembly and the other of the universal joint assemblies;
(d) comparing the second operational angle to the first operational angle to determine a mismatch ratio; and
(e) generating an indicator signal if the mismatch ratio exceeds a predetermined limit.

2. A method as set forth in claim 1, including the step of (f) transmitting the indicator signal to a warning device to alert a vehicle operator that the mismatch ratio has been exceeded.

3. A method as set forth in claim 1, including the steps of (f) transmitting the indicator signal to a central processing unit; and (g) generating a control signal for actively adjusting an adjustment component until the mismatch ratio is less than the predetermined limit.

4. A method as set forth in claim 1, wherein steps (b) and (c) include mounting at least one accelerometer to each of the first and second axle assemblies, measuring the acceleration due to gravity at each of the accelerometers, and determining the first and second operational angles based on gravity measurements.

5. A method as set forth in claim 1, wherein step (a) includes providing mounting plates on each of the first and second axle assemblies and steps (b) and (c) include mounting at least one proximity pickup coil to each of the mounting plates in a plane parallel to the mounting plates, suspending a magnetic member from each of the axle assemblies; measuring the distance of separation between the coil and the magnetic member, and determining the first and second operational angles based on the separation measurements.

6. A method as set forth in claim 1, wherein steps (b) and (c) include mounting a first fluid sensor to the first axle assembly, mounting a second fluid sensor to the second axle assembly; measuring a first fluid level for the first axle assembly with the first fluid sensor; measuring a second fluid level for the second axle assembly with the second fluid sensor; and determining the first and second operational angles based on the first and second fluid levels.

7. A method as set forth in claim 6, including the step of comparing the first and second fluid levels to a base fluid level that is parallel to the ground to determine the first and second operational angles.

8. A method as set forth in claim 1, wherein steps (b) and (c) include mounting a first potentiometer to the first axle assembly, mounting a second potentiometer to the second axle assembly, generating a first signal corresponding in magnitude to the first operational angle with the first potentiometer, and generating a second signal corresponding in magnitude to the second operational angle with the second potentiometer.

9. A method as set forth in claim 1, wherein steps (b) and (c) include mounting a first photo sensor to the first axle assembly, mounting a second photo sensor to the second axle assembly, mounting a first photo detector to the universal joint assembly closest to the first axle assembly, mounting a second photo detector to the universal joint assembly closest to the second axle assembly, generating a first photo signal to determine the first operational angle, and generating a second photo signal to determine the second operational angle.

10. A method as set forth in claim 1, wherein steps (b) and (c) include mounting a first proximity sensor adjacent to one of the universal joint assemblies, mounting a second proximity sensor adjacent to the other of the universal joint assemblies; measuring the separation between the first proximity sensor and the one of the universal joint assemblies, measuring the separation between the second proximity sensor and the other of the universal joint assemblies, and determining the first and second operational angles from separation measurements.

11. A method as set forth in claim 1, wherein steps (b) and (c) include mounting a camera on a vehicle structural member adjacent to the driveline component, scanning the first axle assembly, the drive line component, the universal joint assemblies, and the second axle assembly to generate an image; digitizing the image to generate digital data; and determining the first and second operational angles based on the digital data.

12. A driveline assembly comprising:
a first drive axle having a first center differential with a first input and a first output;
a second drive axle having a second center differential with a second input;
a driveline component interconnecting said first and second axles at opposing ends and defining a central axis;
a first universal joint assembly connecting a first end of said driveline component to said first output and defining a first operational angle between said first center differential and said central axis;
a second universal joint assembly connecting a second end of said driveline component to said second input and defining a second operational angle between said second center differential and said central axis;
at least one sensor assembly mounted adjacent to said driveline component for measuring said first and second operational angles wherein said sensor assembly generates a first signal corresponding in magnitude to said first operational angle and a second signal corresponding in magnitude to said second operational angle; and
a processor for comparing said first signal to said second signal to generate a mismatch ratio.

13. An assembly as set forth in claim 12 wherein said processor is operationally linked to an indicator mechanism and generates an activation signal for activating said indicator when said mismatch ratio exceeds a predetermined limit.

14. An assembly as set forth in claim 12 wherein said processor is operationally linked to an adjustment mechanism and generates an activation signal to activate said adjustment mechanism to adjust a vehicle parameter to correct said first and second operational angles when said mismatch ratio exceeds a predetermined limit.

15. An assembly as set forth in claim 12 wherein said at least one sensor assembly includes a camera mounted to a vehicle structural member and defining a central scan axis that is perpendicular to said central axis, said camera having a scanner for generating a scanned image of said first and second drive axles, said first and second universal joint assemblies, and said driveline component.

16. An assembly as set forth in claim 15 wherein said camera includes a digitizing component that converts said scanned image into digital data for generating said first and second signals corresponding in magnitude to said first and second operational angles.

17. An assembly as set forth in claim 12 wherein said at least one sensor assembly is comprised of a first proximity sensor mounted to a vehicle structure adjacent to said first universal joint assembly and orientated in a position parallel to ground level and a second proximity sensor mounted to a vehicle structure adjacent to said second universal joint assembly and orientated in a position parallel to ground level, said first proximity sensor for sensing a first distance from said first proximity sensor to said first universal joint assembly and generating said first signal corresponding in magnitude to said first operational angle based on said first distance, and said second proximity sensor for sensing a second distance from said second proximity sensor to said second universal joint assembly and generating said second signal corresponding in magnitude to said second operational angle based on said second distance.

18. An assembly as set forth in claim 12 wherein said at least one sensor assembly is comprised of a first photo sensor mounted on said first center differential, a first photo detector mounted on said first universal joint assembly parallel to said central axis, a second photo sensor mounted on said second center differential, and a second photo detector mounted on said second universal joint assembly parallel to said central axis, said first photo detector and photo sensor for generating said first signal and said second photo detector and photo sensor for generating said second signal.

19. An assembly as set forth in claim 12 wherein said at least one sensor assembly is comprised of a first potentiometer mounted to said first drive axle for generating said first signal corresponding in magnitude to said first operational angle and a second potentiometer mounted to said second drive axle for generating said second signal corresponding in magnitude to said second operational angle.

20. An assembly as set forth in claim 19 wherein said first and second drive axles including mounting plates fixed to said first and second center differentials and said first and second potentiometers each include a first link mounted parallel to said mounting plates, a second link extending downwardly from one end of said first link, and a tube interconnecting said first and second links wherein said tube receives a spherical member that moves within said tube as said first and second differentials are tilted and wipes against potentiometer wiping elements to generate said first and second signals.

21. An assembly as set forth in claim 12 wherein said at least one sensor assembly is comprised of a first fluid sensor mounted to said first center differential and a second fluid sensor mounted to said second center differential, said first fluid sensor for generating said first signal corresponding in magnitude to said first operational angle based on a fluid level measured by said first fluid sensor and said second fluid sensor for generating said second signal corresponding in magnitude to said second operational angle based on a fluid level measured by said second fluid sensor.

22. An assembly as set forth in claim 21 including mounting plates fixed to said first and second center differentials and wherein said first and second fluid sensors each include a vertically extending sidewall that is mounted parallel to said respective mounting plate.

23. An assembly as set forth in claim 12 including a first mounting plate fixed to said first center differential and a second mounting plate fixed to said second center differential and wherein said at least one sensor assembly includes a first proximity coil mounted in a plane parallel to said first mounting plate, a first magnetic member suspended from said first center differential, a second proximity coil mounted in a plane parallel to said second mounting plate, and a second magnetic member suspended from said second center differential wherein said first signal is generated based on the separation distance between said first proximity coil and said first magnetic member and said second signal is generated based on the separation distance between said second proximity coil and said second magnetic member.

24. An assembly as set forth in claim 12 including a first mounting plate fixed to said first center differential and a second mounting plate fixed to said second center differential and wherein said at least one sensor assembly includes a first accelerometer mounted parallel to said first mounting plate and a second accelerometer mounted parallel to said second mounting plate, said first accelerometer for generating said first signal based on an acceleration due to gravity measurement at said first drive axle and said second accelerometer for generating said second signal based on a an acceleration due to gravity measurement at said second drive axle.

* * * * *

UNITED STATES PATENT AND TRADEMARK OFFICE
CERTIFICATE OF CORRECTION

PATENT NO.     : 6,490,540 B1
DATED          : December 3, 2000
INVENTOR(S)    : Kruzeja et al.

It is certified that error appears in the above-identified patent and that said Letters Patent is hereby corrected as shown below:

Column 12,
Line 37, please delete "a"

Signed and Sealed this

Eleventh Day of March, 2003

JAMES E. ROGAN
*Director of the United States Patent and Trademark Office*